United States Patent [19]
Muller-Scherak

[11] 3,809,287
[45] May 7, 1974

[54] APPARATUS FOR CLOSED CYCLE DISPENSING OF INDIVIDUAL ITEMS
[76] Inventor: Wolf Georg Muller-Scherak, Vincenz-Statz Str. 8, 5 Cologne 41, Germany
[22] Filed: Sept. 6, 1972
[21] Appl. No.: 286,694

[30] Foreign Application Priority Data
Sept. 8, 1971 Germany................................ 2144812

[52] U.S. Cl. .................................................. 221/66
[51] Int. Cl. ................................................. B65g 57/02
[58] Field of Search ........ 221/307, 310, 66; 312/71; 206/44.12, 56 AC, DIG. 36

[56] References Cited
UNITED STATES PATENTS
2,805,792  9/1957  Schachinger.......................... 221/66

Primary Examiner—Stanley H. Tollberg
Attorney, Agent, or Firm—Diller, Brown, Ramik & Wight

[57] ABSTRACT

This invention relates to a novel apparatus for the closed cycle dispersing of individual flat items of identical shape stacked in a dispenser, the items being tape magazines or the like, a housing for the stacked items or articles, said housing having opposite end portions and article insertion aperture at one of the end portions and an article discharge aperture at the other of the end portions, projection means adjacent the article discharge aperture for normally restraining movement of the stacked articles therepast but being operative to permit individual article movement to said article discharge aperture, and an insertion gap in the housing defined between an article most adjacent the article insertion aperture and a surface of the housing disposed in opposed relationship thereto, and the insertion gap narrowing in a direction away from the article insertion aperture whereby upon the insertion of an article into the gap, the stack of articles is progressively urged toward the article discharge aperture causing an article most adjacent thereto to pass the projection means for dispensing through the article discharge aperture.

5 Claims, 7 Drawing Figures

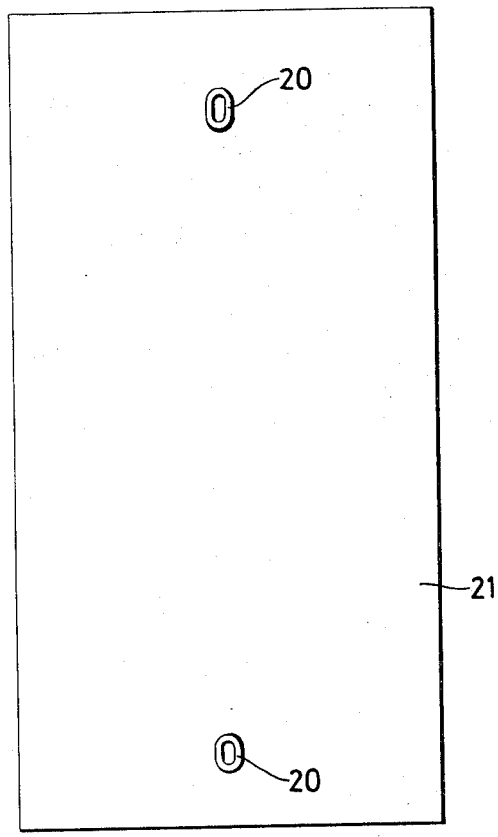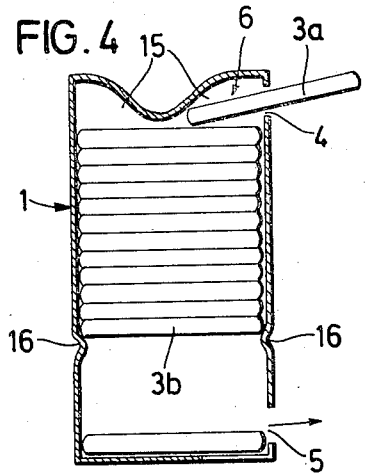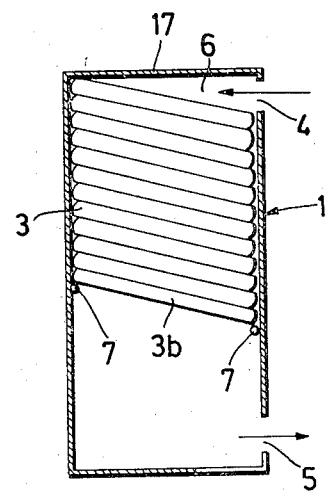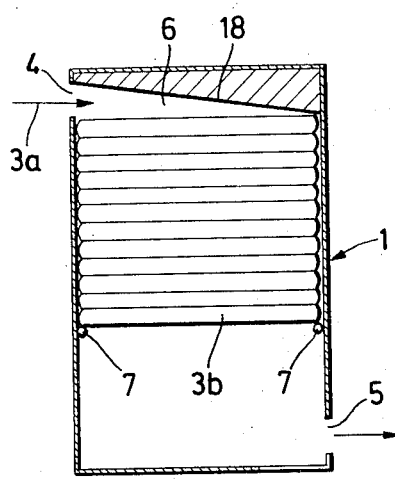

APPARATUS FOR CLOSED CYCLE DISPENSING OF INDIVIDUAL ITEMS

It is known to use containers or housings for the self-service dispensing of articles in stores, shops and the like. The articles are generally stacked in loosely superposed vertical relationship with the stack dropping an increment equal to the size of the articles upon the removal of a lowermost article from the housing. After all of the articles have been removed the housing is refilled with a new stack and dispensing continues repetitiously as each lowermost article is withdrawn. This might be best termed an "open cycle" of dispensing since singular articles can be removed indiscriminately, as opposed to a "closed cycle" of dispensing which requires a specific operation or a specific rule of operation before any one article can be removed from the stack.

It is a novel object of this invention to provide a dispensing apparatus which due to its construction is ineffective as a dispenser unless a predetermined number of items, i.e., a pile height necessary for the dispensing function, does in fact exist. Preferably the dispenser is part and parcel of, for example, a leasing system for tape magazines or the like which must guarantee that the same number of items which are leased per dispenser are returned without the possibility of theft, embezzlement, unfair manipulations, or uncontrolled waste. In other words, the dispenser is intended to assist a leasing organization to safely and completely lease a dispenser containing a predetermined number of articles, achieve the return of the same number of articles, and repeat the leasing as necessary.

The latter object is realized by providing the dispenser with a "lock" which can only be overcome by maintaining a specific stack height of articles within the dispenser. To this end, the dispenser includes article insertion and article discharge apertures with retaining projections adjacent the article dispensing aperture and a predetermined distance being established between the projections and the article inserting aperture which includes an article insertion gap adjacent the article insertion aperture which narrows in the direction of insertion adjacent an uppermost article of the stack, said distance being determined such that the insertion of an article into the insertion gap will cause the lowermost article to overcome the retaining projections for release to the article discharge aperture only if a predetermined number of articles (stack height) exists in the dispenser.

The foregoing establishes what is considered a "closed cycle" of dispensing which is not only of a simple construction and of an economical price, but also assures that the leaser, user or the like may only utilize the discharged articles if the predetermined number thereof is not reduced by more than one or, stated otherwise, a predetermined stack height must be maintained before dispensing will be functionally operative. Moreover, the system requires that each article is of an identical or substantially identical size. Thus after a bottommost article of the stack has been removed and used, i.e., after reproduction of the tape, the article can be reintroduced through the article insertion aperture and thus used as a "key" to displace the next succeeding article adjacent the article discharge aperture. This closed cycle principle which calls for a predetermined number or height of articles in order to function will insure that no article can be stolen because to gain access to the remaining articles the original article must be reinserted into the dispenser through the article insertion aperture. The obvious importance of the latter fact is apparent when it is recognized that the purpose of the dispenser is that of leasing or hiring out a definite number of tape magazines or the like and obviously receiving in return the like number for subsequent releasing.

In one embodiment of the invention the dispenser or container is preferably made of plastic material and a front side thereof is at least partially transparent to, for example, read titles and other identification on the tape magazines or articles. This can also be achieved by a viewing slot which may or may not be covered with a strip of transparent material.

It is a further object of this invention to render the dispenser readily attachable and detachable, particularly to the instrument panel of an automotive vehicle, a music box or the like, by providing a rear side thereof with magnetic mounting means or by using a resilient mounting plug or plugs detachably engageable with a slot in a coordinated support plate which is conventionally secured to the vehicle, music box or the like.

A further object of this invention is to achieve the narrowing of the heretofore described insertion gap of the dispenser in different ways by, for example, disposing the retaining projections at the same height while at the same time providing a guide surface adjacent the article insertion aperture which is inclined toward the projections or, alternately, offsetting the retaining projections in height lengthwise of the dispenser with the stacked articles being respectively parallel and inclined relative to an imaginary straight line along the dispenser axis.

In the case of a stack whose articles are parallel to the latter imaginary line it is an object of this invention to provide a guide surface in part defining the narrowing insertion gap extending in inclined relationship from the article insertion aperture toward a point generally diametrically opposite thereto or simply partially to the last-mentioned point. The guide surface may be either straight or curved, i.e., the inclined guide surface may be unprofiled and inclined under a corresponding angle relative to the uppermost article of the stack, or it may have a surface having one or more shallow S-curves. In this connection, the guide surface may be of an areal design or it may be formed to include at least one spring element for urging the stack of articles in a direction toward the article discharge aperture. Subject to the desired configuration of the guide surface the lowermost article will be urged to and eventually beyond the retaining projections so that it is released from the stack and may be removed from the container through the article discharge aperture.

The guide surface may also be designed as an element separate and apart from the dispenser housing and insertable thereinto with the same including ribs or plate members which carry the retaining projections or, alternately, all the last-mentioned structure may be formed from a single homogeneous element as, for example, molded plastic.

A further object of this invention is to provide opposite the article discharge aperture a surface which inclines downwardly and outwardly toward the article discharge aperture whereby a lowermost article passing the retaining projections is urged toward the discharge aperture with a bottom wall adjacent thereto being additionally provided with a finger passage for gripping the article to be removed.

Obviously it is desired to avoid the insertion of elements into the dispenser which are not the same as those withdrawn therefrom. Thus, in the case of tape magazines, the latter may include one or more notches corresponding with noses or ribs internally of the dispenser and any items which are not correspondingly notched will not meet with the noses and will, therefore, not be permitted full introduction into the article insertion aperture and hence the cooperation between the notches and noses will block all but the intended closed cycle functional operation of the dispenser.

With the above and other objects in view that will hereinafter appear, the nature of the invention will be more clearly understood by reference to the following detailed description, the appended claims and the several views illustrated in the accompanying drawings.

IN THE DRAWINGS:

FIG. 3 is an elevational view of a supporting plate, and illustrates aperture means for releasably receiving resilient plug elements of the dispenser.

FIG. 4 is a sectional view similar to FIG. 2 of another dispenser, and illustrates an integral guide surface formed by a top wall adjacent the article insertion aperture and integral retaining projections adjacent the article discharge aperture.

FIG. 5 is a view similar to FIG. 2, and illustrates another embodiment of the invention in which the retaining projections are offset lengthwise of the dispenser housing such that the stacked articles are disposed in oblique relationship to the housing axis.

FIG. 6 is a view similar to FIG. 2, and illustrates the article insertion and article discharge apertures at diametrically opposite sides of the dispenser housing.

Figure 1:
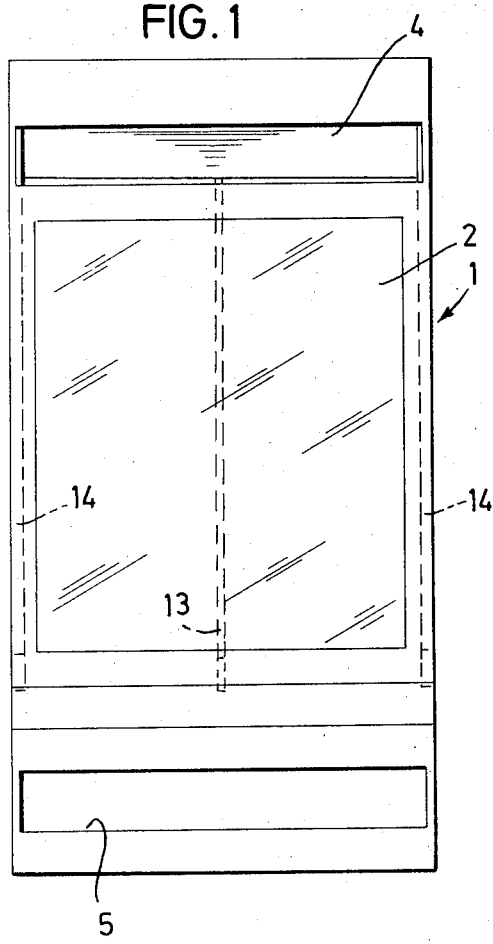
FIG. 1 is a front elevational view of a novel dispenser or container constructed in accordance with this invention and illustrates a housing having a transparent front wall and article insertion and article dispensing apertures.
Figure 2:
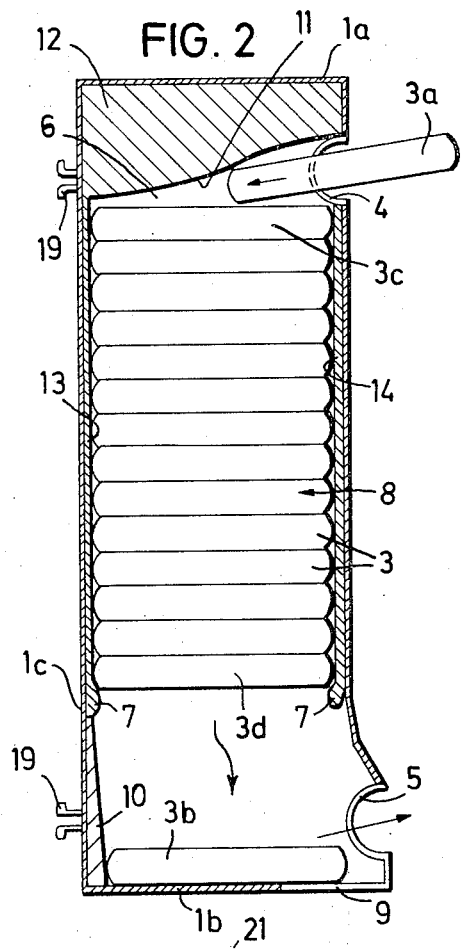
FIG. 2 is an axial sectional view of the dispenser of FIG. 1, and illustrates a narrowing guide surface of a shallow S-shaped configuration adjacent the article insertion aperture, and a lowermost article incident to being removed from the article discharge aperture.

Referring particularly to FIGS. 1 and 2 of the drawings, a dispenser or container 1 is shown constructed of plastic or similar material having a transparent viewing window 2, and housing a stack or pile of flat articles 3 which may be, for example, tape magazines having labels (not shown) bearing indicia (also not shown) which is readable through the window 2. At an upper end portion (unnumbered) the dispenser 1 is provided with a slot-like article insertion aperture 4 while at a lower end portion (unnumbered) the dispenser 1 includes a slot-like article discharge aperture 5.

Figure 2A:
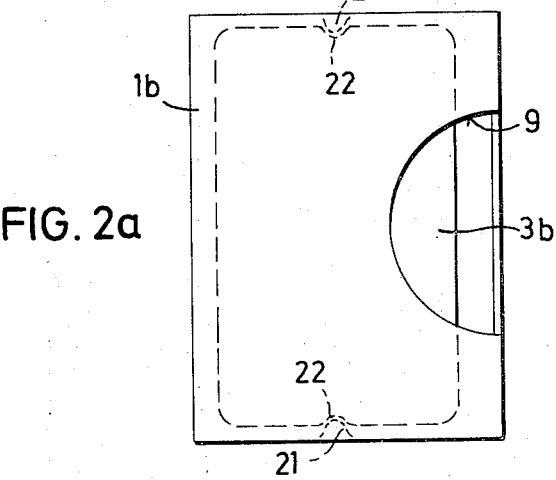
FIG. 2a is a bottom view of the dispenser looking upwardly in FIGS. 1 and 2, and illustrates a finger passage adjacent the article discharge aperture for withdrawing dispensed articles.

In accordance with the invention, the article insertion aperture 4 has adjacent thereto internally of the dispenser or housing 1 an insertion gap 6 which narrows in the direction of insertion which, as best viewed in FIG. 2, is in a right-to-left direction. Thus as an article 3a, for example, is inserted through the article insertion aperture 4, the same will bear and press downwardly upon an uppermost article 3c (FIG. 2), causing a lowermost article 3b to move beyond projection means 7 adjacent the article discharge aperture 5 which normally restrain movement of the stacked articles therepast but being operative to permit each lowermost article 3d to move therebeyond and upon a lowermost wall 1d or subsequent removal through the discharge aperture 5. In order to facilitate the removal of an article thus discharged, such as the article 3d, the bottom wall 1d of the dispenser 1 is provided with a finger passage 9 (FIGS. 2 and 2a) of a generally arcuate or curved configuration and, moreover, diametrically opposite the article discharge aperture 5 is a wall 10 whose surface (unnumbered) is inclined toward the aperture 5 in a direction from top to bottom thus serving as a guide to direct each dropping article in the direction of the two lower unnumbered arrows in FIG. 2 toward the article discharge aperture 5 as well as in greater overlying relationship to the finger passage 9.

Referring particularly to FIG. 2, the insertion gap 6 is narrowed by a guide surface 11 which is of a slight or shallow S-shaped configuration and extends in the insertion direction downwardly and to the left from a point just above the article insertion aperture 4 to a diametrically opposite point which is between the first-mentioned point and the bottom wall 1d. For reasons of production, the guide surface 11 is formed as a surface of a separate inserted element 12 suitably secured in the dispenser 1 by, for example, being glued or otherwise fastened to an uppermost wall 1a thereof. The element 12 is of a one-piece homogeneous construction and includes a plurality of ribs 13, 14 running lengthwise of the dispenser with the rib 13 including the inclined wall 10. In the illustrated embodiment of the side walls (unnumbered) of the dispenser 1 each include a rib 14 whereas the back wall 1c has adjacent thereto the rib 13. Alternately, the ribs 14, 14 may be omitted and a rib corresponding to the rib 13 may be disposed adjacent the front wall (unnumbered). It is also possible to design the insert 12 in such a way that plate elements rather than ribs 13, 14 are connected with the guide surface 11.

In order to prevent theft, embezzelement, etc. by the introduction of elements into the dispenser 1, other than the designated articles 3, the articles 3 may be provided at one or more edges thereof with one or more notches 22 cooperative with corresponding noses 21 interiorly of the dispenser 1 running, for example, the length of the chute or chamber 8. Thus, items absent corresponding notches 22 will not fit into the chute 8 and hence the lowermost article 3c cannot be improperly dispensed by the forced movement thereof past the projections 7.

The width of the guide surface 11 in a direction transverse to the infeed direction, as designated by the unnumbered headed arrow associated with the article 3a, may be optionally of the entire width of the chamber 8 from side-to-side or may be narrower and centrally located or may be simply at each side but not at the center. Likewise instead of being a separate element 12 the guide surface 11 may be an integral part of the dispenser housing 1 and preferably the top wall 1a thereof. The depth of the guide surface 11 in the direction of insertion may also be adapted to the prevailing conditions and those shown extending completely diametrically across the dispenser 1 in FIG. 2 it may only extend part-way (one-half) thereacross.

Reference is now made to FIG. 4 which shows projections 16, 16 formed as integral portions of the dispenser 1 with the same being in alignment with each other or at an identical level so that the insertion gap 6 must be narrowed by external means to insure that with the introduction of an item 3a, the lowermost item 3b will be removed from the slot 5 after having been pressed beyond the retaining projections 16. In this case, the guide surface for performing the latter-noted function is a surface 15 formed as an integral portion of the top wall of the dispenser 1.

Referring to FIG. 5 of the drawing, the individual articles though in parallel relationship, as in the other figures, are also disposed obliquely due to the disposition of the projections 7 in offset relationship lengthwise of the dispenser so that the insertion gap 6 narrows as heretofore described except in conjunction with a flat top wall 17 and not an inclined wall as in the case of FIGS. 2 and 4.

While the preceding examples have all provided insertion and discharge apertures at the front side (unnumbered) of the dispenser 1 the same may be arranged at the small sides (unnumbered) of the dispenser 1 according to the embodiment of the invention illustrated in FIG. 6. In this case the articles 3, 3b are inserted into the insertion gap 6 through the article insertion aperture 4 whereupon they strike an oblique guide surface 18 thus releasing the lowermost article 3b past the projections 7 as heretofore described after which removal of each article is through the article discharge aperture 5.

Preferably all the containers are conveniently connected in a detachable manner to, for example, an automotive dashboard, a music box, tape recorder, or the like. To this effect, the rear side of the dispenser 1 is provided with outwardly projecting resilient plug elements 19 cooperating elastically with slots 20 in a supporting plate 21 or in another support. Obviously, it is also possible to provide magnets in lieu of the resilient plug elements 19.

While a preferred form and arrangement of parts has been shown in illustrating the invention, it is to be clearly understood that various changes in detail and arrangement of parts may be made without departing from the spirit and scope of this disclosure.

I claim:

1. Apparatus for the closed cycle dispensing of individual articles from a stack comprising means defining a vertically elongated housing for the stacked articles, said housing having opposite axial end portions, an article insertion aperture at an upper one of said end portions opening in a horizontal direction and an article discharge aperture at a lower opposite other of said end portions opening in a horizontal direction, projection means adjacent said article discharge aperture for normally restraining downward vertical movement of said stacked articles therepast but being operative to permit individual article movement to said article discharge aperture, an insertion gap in said housing defined between an article most adjacent said article insertion aperture and a fixed stationary guide surface of said housing disposed in opposed relationship thereto, said insertion gap narrows in a direction away from said article insertion aperture whereby upon the insertion of an article into said gap and the movement thereof along said guide surface said stack of articles is progressively urged downwardly toward said article discharge aperture causing an article most adjacent thereto to pass said projection means for horizontal dispensing through said article discharge aperture, and said projection means and said guide surface are defined by a single one-piece element disposed within said housing.

2. The apparatus as defined in claim 1 including at least a single rib disposed lengthwise between said article insertion and article discharge apertures for guiding an article during the descent thereof therebetween.

3. The apparatus as defined in claim 1 wherein said projection means are in diametrically opposite relationship offset lengthwise of the housing between said article insertion and article discharge apertures whereby said stack of articles are disposed obliquely in said housing.

4. The apparatus as defined in claim 1 including at least a single rib disposed lengthwise between said article insertion and article discharge apertures for guiding an article during the descent thereof therebetween, and articles are notched to receive said rib.

5. Apparatus for the closed cycle dispensing of individual articles from a stack comprising means defining a vertically elongated housing for the stacked articles, said housing having opposite axial end portions, a horizontally opening article insertion aperture at an upper one of said end portions and a horizontally opening article discharge aperture at a lower opposite other of said end portions, projection means adjacent said article discharge aperture for normally restraining downward vertical movement of said stacked articles therepast but being operative to permit individual article movement to said article discharge aperture, an insertion gap in said housing defined between an article most adjacent said article insertion aperture and a fixed stationary guide surface of said housing disposed in opposed relationship thereto, said insertion gap narrows in a direction away from said article insertion aperture whereby upon the insertion of an article into said gap and the movement thereof along said guide surface said stack of articles is progressively urged downwardly toward said article discharge aperture causing an article most adjacent thereto to pass said projection means for horizontal dispensing through said article discharge aperture said surface is slightly of an S-shaped curved configuration, said S-shaped surface initiates above said insertion aperture and terminates at a point below the point of initiation whereby the S-shaped surface and an uppermost article effect a wedging action to force the stack downwardly upon the insertion of an article into said gap.

* * * * *